United States Patent [19]

Sharp

[11] Patent Number: 4,653,312

[45] Date of Patent: Mar. 31, 1987

[54] STORAGE TANKS HAVING FORMED RIGID JACKET FOR SECONDARY CONTAINMENT

[76] Inventor: Bruce R. Sharp, 4090 Rose Hill Ave., Cincinnati, Ohio 45229

[21] Appl. No.: 824,680

[22] Filed: Jan. 31, 1986

Related U.S. Application Data

[63] Continuation-in-part of Ser. No. 745,540, Jun. 17, 1985, and a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, and a continuation-in-part of Ser. No. 580,800, Feb. 16, 1984, Pat. No. 4,524,609, which is a continuation-in-part of Ser. No. 544,012, Oct. 21, 1983, abandoned.

[51] Int. Cl.[4] .................................................. G01M 3/32
[52] U.S. Cl. ........................................ 73/49.2; 156/289; 220/469
[58] Field of Search .................. 73/49.2, 49.3, 40.5 R, 73/40; 340/605; 220/466, 469, 5 A; 156/62.4, 289, 292

[56] References Cited

U.S. PATENT DOCUMENTS

| | | | |
|---|---|---|---|
| 3,335,903 | 8/1967 | Anderson | 220/452 |
| 3,335,904 | 8/1967 | Anderson | 220/452 |
| 3,700,512 | 10/1972 | Pearson et al. | 220/5 A X |
| 4,561,292 | 12/1985 | Pugnale et al. | 73/49.2 |
| 4,568,925 | 2/1986 | Butts | 73/49.2 |

FOREIGN PATENT DOCUMENTS 1150248  6/1963  Fed. Rep. of Germany ....... 73/49.2

Primary Examiner—Stewart J. Levy
Assistant Examiner—Joseph W. Roskos
Attorney, Agent, or Firm—Charles R. Wilson

[57] ABSTRACT

A method of making a jacketed storage tank comprises applying a separating agent over the storage tank, applying a layer of fibrous reinforcing material on the separating agent, and thereafter applying a resinous material. The resultant jacket, covering at least about 40% of the surface area of the storage tank, is structurally independent therefrom. True secondary containment can be provided by the jacket. A fail safe containment storage tank system is provided by the use of a leak detector to monitor the closed space between the storage tank and jacket for tank or jacket leakage.

38 Claims, 10 Drawing Figures

STORAGE TANKS HAVING FORMED RIGID JACKET FOR SECONDARY CONTAINMENT

This is a continuation-in-part application of "Fiberglass Reinforced Resin Storage Tanks Having Secondary Containment," Ser. No. 745,540, filed June 17, 1985 and a continuation-in-part of "Storage Tanks Having Secondary Containment Means," Ser. No. 740,869, filed June 3, 1985, now U.S. Pat. No. 4,607,522 which is a continuation-in-part of "External Jacket System as Secondary Containment for Storage Tanks," Ser. No. 544,013, filed Oct. 21, 1983, now U.S. Pat. No. 4,523,454, and "Storage Tank Systems," Ser. No. 580,800 filed Feb. 16, 1984, now U.S. Pat. No. 4,524,609, which is a continuation-in-part of Ser. No. 544,012, filed Oct. 21, 1983, now abandoned.

This invention relates to storage tanks. More particularly, the invention relates to underground storage tanks which have secondary containment means.

BACKGROUND OF THE INVENTION

Commercial and industrial storage tanks are widely used for storing a great variety of liquids. Some of these liquids are highly corrosive and/or are flammable. The service life of a storage tank will vary, depending upon environmental conditions, including the liquid being stored. Eventually, however, the tank will become corroded and develop leaks. This can result in a significant danger to the environment and health of nearby residents. For example, storage tanks are commonly used for storing gasoline at service stations. Gasoline, of course, is highly flammable and is capable of posing a significant health and safety hazard if not properly contained. Federal as well as local regulations govern the structure of such storage tanks.

Heightened public awareness of the danger posed by storage tanks (particularly underground gasoline storage tanks) has led to additional governmental regulations. Recent proposed regulations will soon require most storage tanks to have secondary containment means and possibly a fail safe design feature to guard against accidental soil, water, and air contamination. Secondary containment means must be capable of containing leaked liquid from the storage tank. Rigid double walled tanks have been suggested as one alternative. While effective for containment purposes, such tanks, as presently available, are costly to build and difficult to install because of their weight. Such tanks are built by basically forming two rigid tanks utilizing different sized, reusable molds and then placing one tank inside the other.

Single and double walled tanks made from fiberglass reinforced resinous material are built using a number of distinct time consuming steps. In all known methods, a cylindrical-shaped, reusable mold is used to build tank halves which are subsequently assembled. Initially, layers of fiberglass followed by a resinous coating are applied to the mold or chopped fiberglass/resin streams are simultaneously directed onto the mold and subsequently cured. Sufficient applications of the fiberglass and resin are made until a wall thickness is obtained which has the desired strength. Next, support rib molds of cardboard, four to six inches wide, are placed completely around the cylinder at approximately sixteen inch intervals. Fiberglass and resin are then applied over the cardboard molds and onto adjacent areas of the cylinder so as to become an integral part of the inner tank shell. The mold is finally removed. The cylindrical-shaped wall, including the ribs and one end of the tank, are produced in this stage of the method. The above steps are repeated to obtain a second half-tank. The two half-tanks are then joined together by appropriate sealing means. The resultant single walled tank is capable of being installed in the ground and, in fact, is of the type which has been extensively used for the past twenty years.

In more recent years, double walled tanks have been built and used. Essentially, these tanks are built by the same method as the single walled tanks. An inner, rigid tank is formed in the above described manner. Next, a larger diameter reusable mold is used to build a horizontal half-tank. The fiberglass/resin is applied in a known manner to the mold and cured to form the half-tank. A second horizontal half-tank is formed. Next, the completed inner tank is placed into the larger diameter half-tank. The ribs on the inner tank are properly dimensioned to act as spacer ribs between the two tanks. The second larger diameter half-tank is placed over the inner tank, joined and sealed at the seams with its matching half-tank. The resultant product is a double walled storage tank system comprised of essentially two rigid tanks, one inside the other.

A second method of making double walled fiberglass, reinforced, resinous tanks is similar to the above method and is just as time consuming and costly. In this method, the mold has a design wherein the ribs are formed as the fiberglass and resin material is applied. After forming the inner tank of which the ribs are an integral part thereof, the mold is removed. The interior portion of the tank next has a fiberglass/resin layer applied over the rib indentations to result in a smooth cylindrical-shaped interior. A second half-tank is formed in the same manner and the two halves joined. A cylindrical-shaped outer tank is then formed in horizontal halves. The formed inner tank and outer tank halves are assembled as in the first method described above to form a double walled storage tank system based on two rigid tanks with support ribs therebetween.

As is readily apparent, building a double walled storage tank system by known methods is very labor extensive and costly. Recent concerns about leaked tanks has heightened the need for an efficient and economical manner of building double walled storage tank system. A jacketed storage tank system, as disclosed in my U.S. Pat. No. 4,523,454 also provides secondary containment means and avoids the problems associated with the rigid double walled systems. Additionally, the aforementioned jacket system features a fail-safe design due to the fact it provides continuous monitoring means whereby the integrity of both the primary and secondary containment means are checked to insure that leakage of either containment means is known when it first occurs.

There has now been discovered methods whereby new and used storage tanks can be provided with secondary containment means in a convenient, yet economical manner. Further, used storage tanks are refurbished to a standard equivalent to that possessed by a new tank and then upgraded to have a secondary containment feature.

SUMMARY OF THE INVENTION

A method of adding secondary containment capability to storage tanks comprises the steps of (a) applying a separating agent to a storage tank, (b) applying a layer of a fibrous reinforcing material onto the storage tank, and (c) applying a resinous material onto the reinforcing material. When the resinous material is cured, a containment means is formed which covers at least about the lower 40% of the surface area of the storage tank, thereby providing secondary containment for any liquid which may leak from the storage tank. The space between the storage tank and newly formed secondary containment means can be monitored for any leakage.

DETAILED DESCRIPTION OF THE INVENTION

While the description to follow describes the invention in terms of its use with underground storage tanks, it should be understood the invention has applicability for other uses as well. However, the invention lends itself particularly well to underground storage tanks used for storing liquid gasoline and, therefore, this preferred use is described in the following paragraphs.

Figure 1:
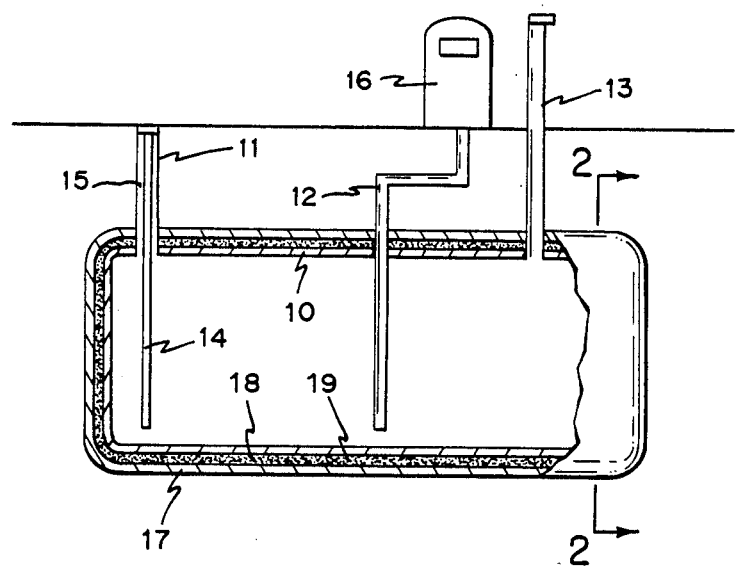
FIG. 1 is a side view in partial section of a storage tank having a fibrous reinforced resinous material as a jacket completely surrounding the tank.

With reference to FIG. 1, there is shown an underground storage tank 10. Storage tanks 10 of the type shown in FIG. 1 are well known and are widely used, especially in the gasoline service station industry. They are typically made of metal or, more recently, a fiberglass reinforced resin material. Either type of tank has use in this invention. A typical metal storage tank is shown in FIG. 1. Sufficient openings are found in the storage tank 10 to allow for various access lines to communicate with the interior of the tank. As shown, lines 11, 12, and 13 are a fill pipe, dispensing line and vent pipe, respectively.

The fill pipe 11 provides as its obvious function the means by which gasoline can be pumped into the inner tank from an outside source, e.g. a tank truck. As illustrated in FIG. 1, fill pipe 11 comprises a line 14 through which gasoline flows to the inner tank 10 and a space 15 within the fill pipe which acts as a vapor recovery line. As gasoline is pumped into the inner tank, gasoline vapors which are formed are sucked through the space 15 back to the tank truck for recovery. This reduces the amount of gasoline vapors which would otherwise be vented to the atmosphere or remain in the inner tank preventing the tank from being filled completely with gasoline. As used throughout here, the term "fill pipe" connotes the pipe by which gasoline is pumped to the tank; it can be a single pipe, but more often has vapor recovery means associated with it and is often referred to as a vapor recovery fill line. As shown in FIG. 1, line 14 extends into the inner tank 10 with its end near the bottom.

Dispensing line 12 is used for withdrawing gasoline and delivering it to the consumer through gasoline dispenser 16. While not illustrated in FIG. 1, a pump is positioned within the inner tank, dispensing line or gasoline dispenser for pumping gasoline to the dispenser. The bottom of the dispensing line 12 is in close proximity with the bottom of the inner tank 10. The vent pipe 13 is optional, though preferred, and merely provides means by which gasoline vapors resulting primarily from a filling operation can be vented to the atmosphere. The opening to the atmosphere is normally substantially off ground level for safety reasons. All the aforementioned pipes and lines are securely attached to the rigid inner tank. Outer jacket 17 provides the secondary containment enjoyed by the tanks of this invention while closed space 18 provides a means by which leakage of the inner tank and jacket can be detected.

A separating agent is applied to the storage tank before the jacket is formed. The purpose of the separating agent is to insure that a subsequently applied fibrous reinforcing material and resinous material which form the jacket will not adhere to the inner storage tank. It is necessary that the cured jacket and the storage tank have a space between the two. Such space is closed and provides true secondary containment capability. Additionally, any sudden stress in the rigid storage tank which may cause a crack therein is less likely to be transmitted to the jacket 17 because of the structural independence of the storage tank and jacket. Still, another function of the closed space 18 is to provide a means by which the space therein can be monitored for possible tank or jacket leaks.

Figure 2:
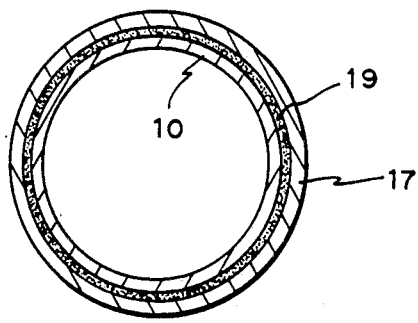
FIG. 2 is a end view of the storage tank of FIG. 1 taken along lines 2—2.

One desired separating agent is a wax material which can be subsequently heated and optionally removed so as to destroy any adhesion between the jacket and the underlying storage tank. Another is a solid material which acts as a separating agent as well as a corrosion inhibiting agent, e.g. grease. Another preferred separating agent, shown in FIGS. 1 and 2, is a gas pervious material 19. Such materials are foraminous or porous and can take on various physical shapes and structures. Examples of such materials are mattings, nets, screens, and meshes. Specific examples are jute, polyurethane foam, polyester foam, fiberglass matting, cotton matting, nylon matting, corrugated cardboard, and asbestos. A heat seal or sealing material, e.g. a polymeric coating or film such as Mylar or a polyethylene, is used on one surface of the gas pervious material when needed to prevent substantial saturation with a subsequently applied resinous material as discussed in the following paragraphs. Other separating means include stored liquid, e.g. gasoline-soluble and water-soluble solid materials. These materials are especially useful when used in conjunction with certain types of monitor means as discussed in the following paragraph.

Jacket 17 is a fibrous reinforced resinous material. It is formed by first applying a layer of fibrous reinforcing material on separating agent 19 found on storage tank 10. The fibrous reinforcing material can take on many different physical shapes and structures variously referred to as mattings, nets, screens, meshes, and chopped strands. Examples of fibrous materials include fiberglass, nylon, and other synthetic fibrous materials. The fibrous material, if in a sheet form, can be laid onto the storage tank as a continuous matting.

Once the fibrous reinforcing material is applied, a resinous material is next applied to the reinforcing material and thereafter cured. Several different resinous materials are known for the purpose of reinforcing fibrous material. Such materials include polyesters, e.g. vinylesters, isophthalic polyesters, polyethylene, polypropylene, polyvinylchloride, polyurethane, and polyepoxide. The listed resinous materials used in the construction of this jacket are not all inclusive, but only illustrative of some of the resinous materials which can be used. Alternatively, the fibrous material can be applied in the form of chopped strands with the resinous materials described in the previous paragraph. That is, the chopped strand and resinous material can be sprayed from separate nozzles of the same spray gun and the jacket formed therefrom on the separating agent as the resin cures. Other known methods of forming a fibrous reinforced resin substrate can be used.

The shape of the resultant jacket is such that it encases the rigid inner storage tank to form a closed space 18, but is not a structural part of it. The jacket itself is capable of containing any liquid which is stored in the storage tank and which has leaked therefrom. The strength of the jacket has sufficient structural integrity to withstand external load forces normally encountered by underground storage tanks without suffering cracking or collapsing. As used herein, cracking is defined to means the jacket structurally tears apart to the extent a liquid will at least seep there through. Slight surface deformations can be tolerated; however, deflections of greater than about two inches from the norm would be considered a collapse. Preferably, the jacket is rigid and will not noticeably crack or collapse when external load forces are encountered during normal use. The jacket is capable of holding over 100% by volume of the liquid stored in inner storage tank 10, more preferably from about 101% to about 150% by volume of the liquid stored in the inner tank.

Figure 3:
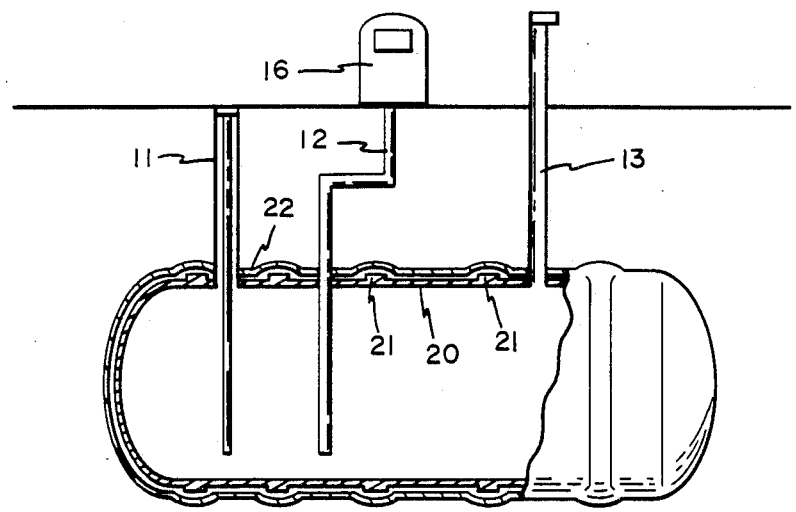
FIG. 3 is a side view of a typical fiberglass reinforced resinous storage tank having support ribs surrounding the tank and a jacket of a fibrous reinforced resinous material surrounding the storage tank.

FIG. 3 illustrates a typical fiberglass reinforced resinous storage tank 20. Such tanks are formed with supporting ridges 21 circumferentially surrounding the tank. The ribs act as supports so that the weight of the tank, including the contents therein are evenly distributed and add strength needed to withstand earth load stresses. This unique construction has necessitated special fabrications with prior art vaulted storage tanks based on two rigid shells. Such vaulted storage tanks have required first that special supports be positioned between supports ribs 21 to keep the outer rigid shell from collapsing from the earth load stresses. An advantage of this invention is that the fibrous reinforcing material can be laid over the separating agent-covered ridges 21 and the resinous material applied without any special steps to accommodate the ridges 21. The subsequently formed jacket 22 which conforms substantially to the contour of the rigid tank is not only capable of holding any leaked liquid but also is capable of withstanding external load forces without breaking. The steps of applying the fiberglass reinforcing material and the resinous material are the same as described above with respect to the metal storage tank of FIG. 1.

Figure 4:
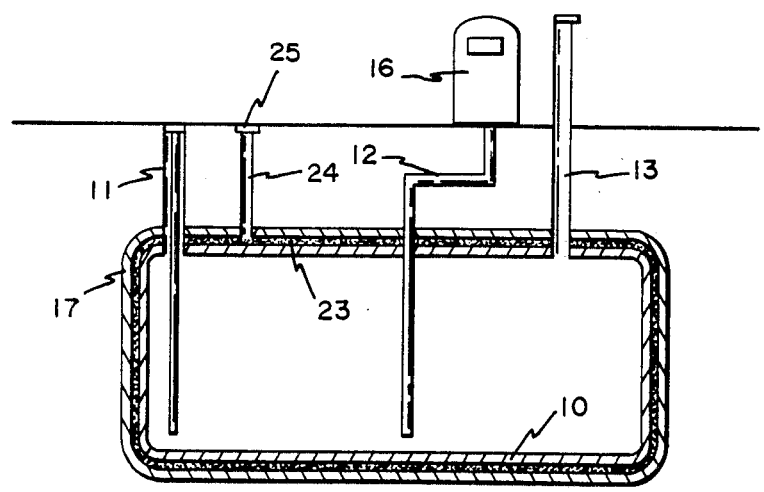
FIG. 4 is a side view of storage tank of this invention illustrating the use of monitor means.

With reference to FIG. 4, separating agent means 23 is a gas pervious material. The space between the jacket 17 and the storage tank 10 can be monitored. As shown in FIG. 4, an access tube 24 extends from ground level through the jacket so as to be in communication with the closed space. Any of well known and commercially available monitor means can be used. For example, the closed space can be filled with a detecting liquid. This detecting liquid can be placed in the closed space by the manufacturer of the tank due to the fact the closed space between the storage tank and jacket occupies a small volume, e.g. about 25–100 gallons detecting liquid is sufficient for use with a 20,000 gallon storage tank. At the end of the access tube is a sight glass 25. Whenever leakage occurs, a change in the level or color of a detecting liquid will occur and will be readily observed in the sight glass. Instead of the sight glass and visual observation of a change in level or color of detecting liquid, non-visual leak detection means such as pressure transducers or float controls can be used to detect a change in level.

Figure 5:
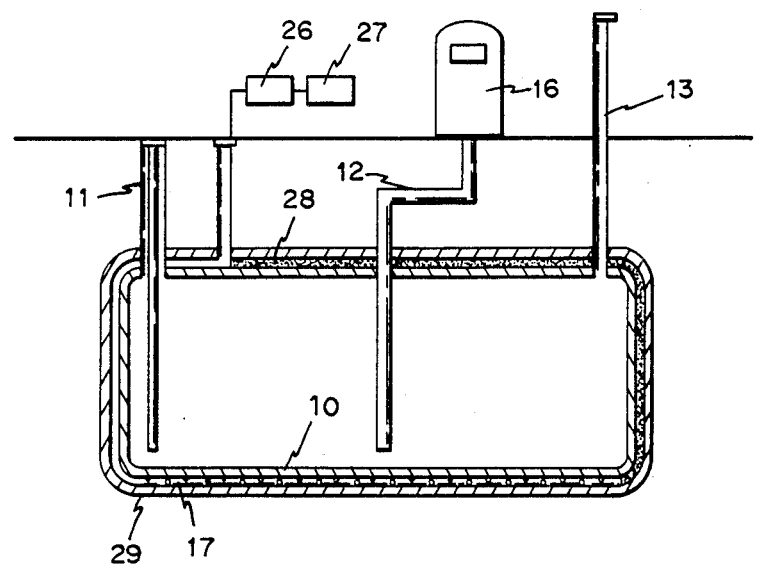
FIG. 5 is a side view of storage tank of this invention illustrating another monitor means.

Alternatively, the closed space can be placed either under a non-atmospheric pressure, i.e. a positive or negative air pressure. Detection means associated with the closed space is capable of detecting any change in pressure resulting from the leak in the jacket or the storage tank. As shown in FIG. 5, there is provided a means 26 for maintaining the closed space under a positive or negative pressure. Conventional air pump or vacuum pump, together with an associated pressure regulator can be used. A pressure change sensor 27 is a part of the detection means. A pressure guage serves this purpose adequately. Optionally, an alarm system can be electronically linked with the pressure sensor to audibly or visually warn of a preset significant pressure change. Gas pervious material 28 maintains a spaced relationship between the inner tank and the jacket when a vacuum is used as well as serves as the separating agent. Preferably, an access tube 29 with strategically spaced holes extends from the air or vacuum pump 26 to the lower portion of the closed space. When tube 29 extends over the end portion of the storage tank, it serves the dual function of strengthening the jacket at that point and providing a means to monitor for leaked liquid at a low point where it could utlimately seek.

Another embodiment of the detection means utilizes an analyzer capable of detecting the liquid being stored. Thus, the detection means comprises the analyzer which is in communication with the closed space. Preferably, a vacuum means for withdrawing gaseous material from the closed space is used for the purpose of obtaining a sample. Thus, in FIG. 5, element 27 could be an analyzer capable of detecting selected liquids instead of a pressure change sensor.

Still another detection means utilizes a probe which extends through an access tube so as to monitor for leakage, preferably at or near the bottom of the closed space. The probe is capable of detecting pre-selected liquids or gases. In this embodiment, the separating agent can be a gas pervious material whereby leakage will ultimately seep to the bottom of the closed space and be detected or a solid which is stored liquid-, e.g. gasoline-soluble or water-soluble. Such solid separating agents will ultimately be solubilized and the leakage detected by the probe.

In the embodiment of this invention wherein used storage tanks are utilized, an additional step must be taken. Such tanks which have been used and removed from the ground typically will have weakened areas in the form of holes, cracks, or pits. The first step is to locate the weakened areas and repair said area. A visual observation of the tank quite often will reveal where the weakened areas occur. A pit is readily repaired with welding or with a reinforced resinous material. Resinous materials which are useful here are those which will adhere to the storage tank and which are resistant to fuel stored in the tank. It is possible the weakened area will extend completely through the wall of the storage tank or eventually will corrode to such a point. In such an instance it is necessary that when liquid contacts the resinous repair material that the material itself is not dissolved or corroded away. A wide range of different resinous materials can be used which have known qualities of adhering to storage tanks and which are resistant to stored liquids such as fuel. Particularly preferred are the polyester and epoxy type resins, which may be reinforced with fiberglass or other known resin fibrous materials.

Once all weakened areas are repaired, it is possible to test the repaired storage tanks in any of several different manners. For example, either a vacuum of air pressure can be applied to the interior of the tank. The failure to maintain the pressure is an indication that a leak is still present. Filling the storage tank with a liquid under pressure and observing for any leaked liquid through the tank is also another obvious manner of testing. Once the tank has been repaired, a vacuum of at least about 3 inches of mercury is applied. Preferably, a vacuum of from about 3 inches to about 10 inches of mercury is applied. This will show not only whether the storage tank still contains leaks, but whether it is structurally sound and capable of being completely refurbished. That is, once the leaks in a used tank have been repaired and the aforementioned vacuum applied, the structural soundness of the tank is established. In the absence of such soundness, the tank will collapse. Of course, when this happens, the tank must be scrapped without continuing further with the steps of this invention or special structural work undertaken. A tank which has been refurbished and certified as structurally sound is provided with a jacket in the manner previously described.

Figure 6:
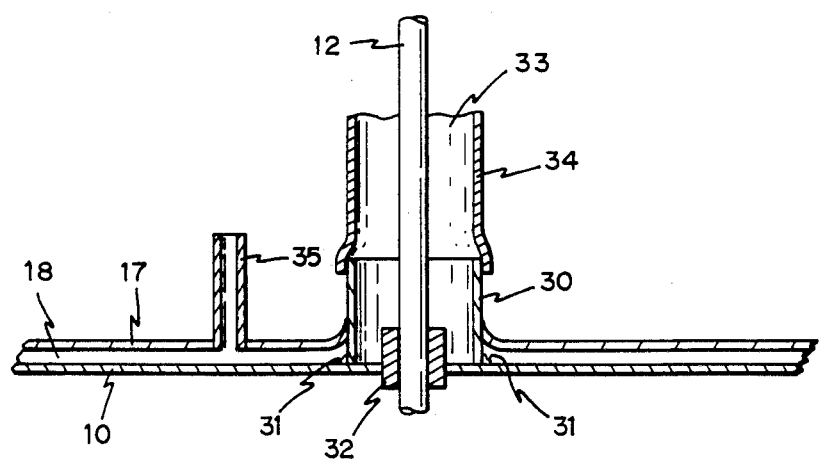
FIG. 6 is a partial view in section of a tank fitting for pipes used in a storage tank of the invention, said tank having monitor means.
Figure 7:
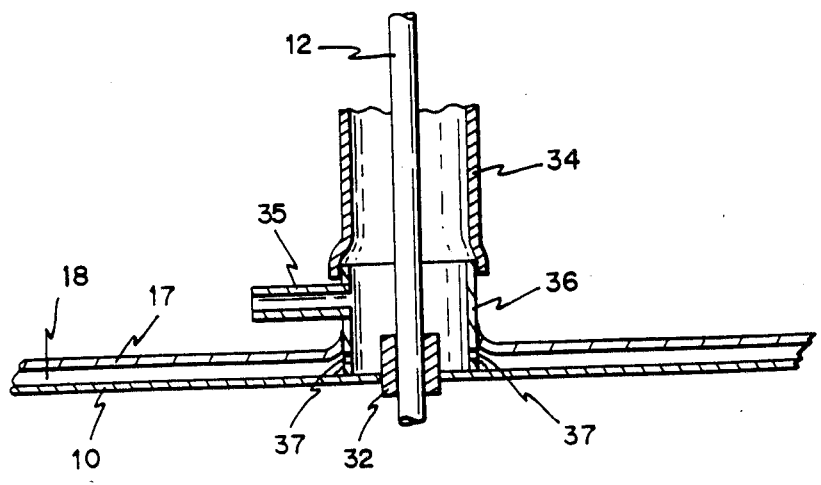
FIG. 7 is a partial view in section of another tank fitting used in a storage tank of this invention wherein a jacketed pipeline connected to the storage tank and jacketed storage tank can both be continuously monitored.

FIGS. 6 and 7 show alternative fittings useful with the storage tanks whereby the closed space between the storage tank and jacket and the closed spaced associated with a jacketed pipeline system can be monitored. In FIG. 6 a fitting 30 is provided for the point at which dispensing line 12 enters the storage tank 10. The fitting which is a cylindrical shaped housing has a large enough inside diameter to fit around the dispensing line 12. The fitting is welded to the storage tank by welds 31. Jacket 17 is securely adhered to the fitting by adhesive means or clamping means so as to form a fluid tight closed space 18. A threaded fitting 32 used to secure dispensing line 12 to the storage tank allows for easy field installation of the storage tank in that once the tank is properly positioned, the necessary pipeline can be installed in a conventional fashion. Closed space 33 is formed by the dispensing line 12 and a flexible jacket 34, which is a part of a jacket pipeline system. Separate monitor means of the type discussed above can be used to monitor for both storage tank and access pipeline leakage, i.e. fill, dispensing, and vent line leakage. Thus, access tube 35 is used for monitoring closed space 18 for storage tank leakage.

The fitting 36 shown in FIG. 7 allows one monitor means be used to monitor for storage tank leakage and pipeline leakage. Thus, fitting 36 is similar to fitting 30 discussed above except openings 37 are provided for communication with closed space 18. The advantage derived from fitting 36 is that it allows for the continuous monitoring of a total underground storage tank and delivery system by one monitor means. Any abnormal reading from the monitor means alerts an attendant to a problem. A further checking can pin point the location of the leak.

All the leak detection means discussed above can be electronically linked with an alarm system to audibly or visually warn of a pre-set significant change in the closed spaces. The leak detection means and secondary containment means allow for an early warning of a deterioration of either the primary or secondary containment means thereby permitting the necessary repair work to be done before any significant soil or water contamination has occurred.

Figure 8:
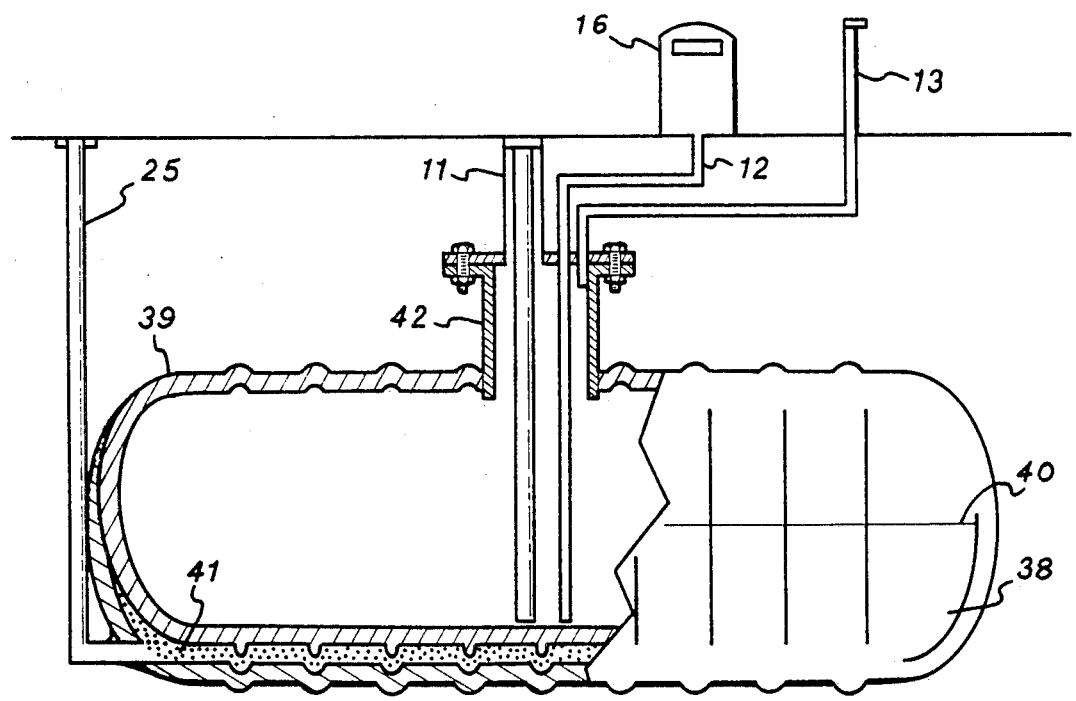
FIG. 8 is a partial view in section of a storage tank having a jacket over only a part of its surface area.

In FIGS. 1 and 2, the storage tank 10 is encased by jacket 17. However, it is possible to obtain partial containment by forming a jacket on at least about 40% of the surface area of the storage tank. For this partial secondary containment feature, the bottom portion of the storage tank (where leaks are most likely to form) has the separating agent and jacket formed thereover. Preferably, at least about 40% and, more preferably, at least about 90% of the surface area of the storage tank has a jacket formed over it. As shown in FIG. 8, jacket 38 covers essentially the bottom half of storage tank 39. Jacket 38 is sealed at edges 40 to form a closed space 41 between said jacket and storage tank 39. The obvious advantage of this system is a cost-savings, while still obtaining adequate containment of that part of the storage tank which is most likely to leak. Gas pervious material 41, positioned in the closed space between jacket 38 and storage tank 39, performs the same function as the gas pervious material described with reference to FIGS. 1, 2, 4, and 5.

Figure 9:
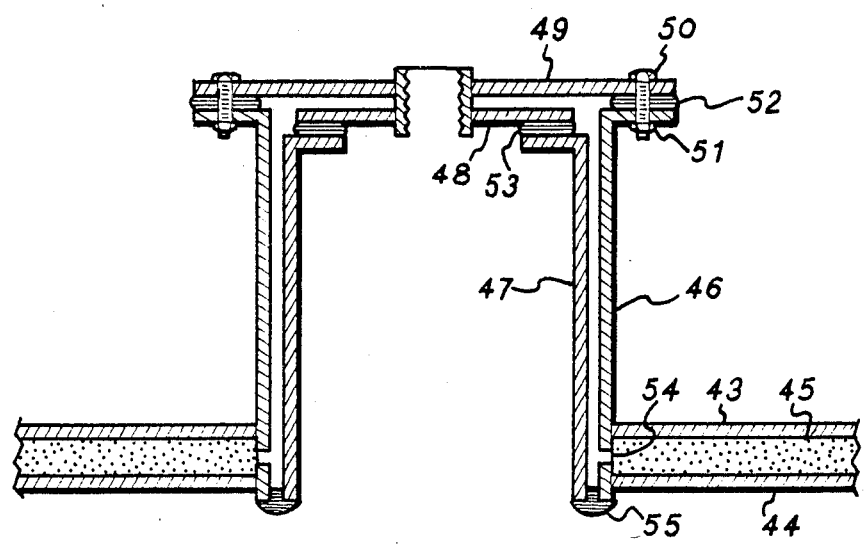
FIG. 9 is a partial view in section of a manhead sleeve especially useful with the storage tank of FIG. 8.

FIG. 9 illustrates an inner manhead sleeve especially useful with the type of storage tank shown in FIG. 8. It provides a means by which 100% total containment is achieved. The inner manhead sleeve 47 comprised of side walls which is in a cylindrical shape form dimensioned to fit within a manhead 46 of the type commonly found on certain storage tanks 44. An inner cover 48 fits over an upper flange of the side walls 47 and an outer cover 49 fits over the inner cover 48 and is attached to the manhead 46 by bolts 50 and nuts 51. A gasket 52 ensures a liquid-tight seal. A second gasket 53 ensures a liquid-tight seal between the storage tank's interior and the closed space defined by the outer cover 49, manhead 46, and inner manhead sleeve 47. Spot welds are used to attach the inner manhead sleeve 47 to the manhead 46. Inner manhead sleeve 47 is dimensioned to fit within the manhead 44, as aforementioned, and to form a closed space which is in communication through hole 54 with the closed space 45 between the inner tank 44 and jacket 43. Sealing material 55 between the inner manhead sleeve and the inner storage tank 44 is to seal the closed soace 45 from the storage tank's interior. Primary containment of the stored liquid is provided by the inner storage tank 44, inner manhead sleeve 47, and inner cover 48. Total secondary containment is provided by the jacket 43, manhead 46 and outer cover 49.

Leak detection means of the type described above can readily monitor the closed space provided by the aforementioned secondary containment system.

Figure 10:
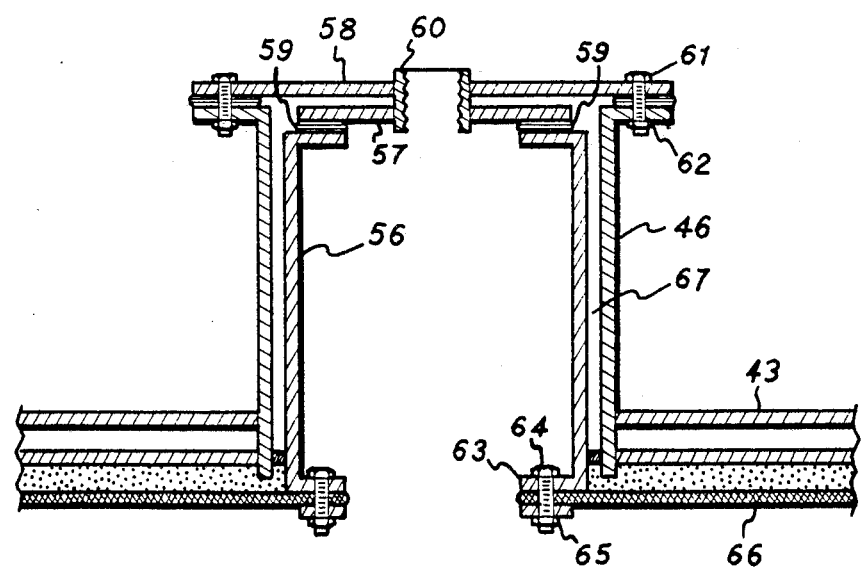
FIG. 10 is another partial view in section of a manhead sleeve having attachment means for a bladder.

FIG. 10 illustrates another inner manhead sleeve useful with storage tanks, the design of which is shown in FIG. 8. Again 100% total containment is achieved. Inner manhead sleeve 56 fits within manhead 46 so as to leave a closed space therebetween. Spot welds are used to accomplish this. Inner cover 57, outer cover 58, gaskets 59, and bolts 61 and nuts 62 perform the same functions as in FIG. 9. Access opening 60 is to provide a means by which a dispensing line can enter. As an added measure of safety, bladder 66 is positioned within the inner storage tank to act as the primary containment means. Lower flange 63 on inner manhead sleeve 56 is used as a means by which a ring clamp, together with bolts 64 and nuts 65, can hold the bladder. Closed space 67 is used to monitor for leakage. The advantage achieved by this system is the ability to provide for true total secondary containment of the stored liquid and to provide for a structure which permits effective leak monitoring. Additionally, by providing for a means by which access lines can pass through the manhead, the total storage system is adequately contained and can be adequately monitored.

While not shown in FIG. 10, a vacuum means could be used to monitor for leakage. Because bladder 66 of FIG. 10 may not be completely gasoline impervious, the vacuum means will withdraw gasoline and water due to natural condensation. The water can be removed by any known separation method and the gasoline returned to the bladder's interior. Optionally, a shut-off valve can be provided to prevent the bladder from being overfilled. Also, the same concept can be used to recover gasoline which may leak from one tank and seep through the jacket of a second tank. Such gasoline would be removed by the vacuum means and directed to the interior of the second.

The invention herein has been described with particular reference to the drawings. It should be understood other variations of the invention are within the scope of coverage.

What is claimed is:

1. A method of adding secondary containment capability to a rigid storage tank, comprising the steps of:
   (a) applying a gas pervious material to a rigid storage tank so that a subsequently formed jacket will not adhere to the tank; and
   (b) applying a fibrous reinforcing material and resinous material onto the gas pervious material to cover at least about 40% of the surface area of the storage tank so that when cured, a jacket independent of the storage tank is formed having sufficient structural strength to contain the liquid in the rigid storage tank which may leak therefrom and having the capability of withstanding external load forces normally encountered by underground storage tanks without suffering substantial surface deformation.

2. The method of claim 1 wherein the storage tank is a metal tank.

3. The method of claim 1 wherein the storage tank is made of a fibrous reinforced resinous material.

4. The method of claim 3 wherein the storage tank contains support ribs surrounding its circumference so as to withstand external forces when buried underground.

5. The method of claim 4 wherein the jacket substantially conforms to the contour of the storage tank.

6. The method of claim 1 wherein the storage tank is a used tank which is first refurbished by repairing weakened areas.

7. The method of claim 6 wherein the weakened areas are repaired with a resinous material which will adhere to the storage tank and which is resistant to liquid stored in the tank.

8. The method of claim 6 further comprising the step of applying a vacuum of at least about 3 inches mercury to the tank prior to being refurbished so as to determine if it is structurally sound and capable of being refurbished to a state equivalent to a new storage tank.

9. The method of claim 1 wherein the fibrous reinforcing material is fiberglass.

10. The method of claim 1 wherein the surface of the gas pervious material which is exposed to the resinous material is first sealed to prevent substantial penetration of the resinous material.

11. The method of claim 10 wherein the gas pervious material is sealed with a polymeric material.

12. The method of claim 10 wherein the gas pervious material is heat sealed.

13. The method of claim 1 wherein the jacket covers at least about 90% of the surface area of the storage tank.

14. The method of claim 13 wherein the jacket completely encases the storage tank.

15. The method of claim 14 wherein an opening is provided in the formed jacket so as to gain access to the space between the storage tank and the jacket for the purpose installing a leak detection means capable of continuous monitoring of the storage tank walls and jacket to detect leakage.

16. The method of claim 14 wherein the storage tank has one or more openings for the purpose of installing access lines, said openings having fittings attached thereto to which the jacket is firmly adhered.

17. The method of claim 14 wherein the gas pervious material is selected from the group consisting of mattings, nets, screens, and meshes.

18. The method of claim 17 wherein the gas pervious material is selected from the group consisting of jute, polyurethane foam, polyester foam, fiberglass matting, cotton matting, nylon matting, corrugated cardboard and asbestos.

19. The method of claim 18, wherein the gas pervious material is a polyurethane foam.

20. The method of claim 14 wherein the fibrous reinforcing material is first laid onto the surface of the storage tank and thereafter the resinous material is applied.

21. The method of claim 14 wherein the fibrous reinforcing material and resinous material together are applied to the storage tank.

22. A storage tank for liquids having secondary containment capability, comprising
   (a) a rigid inner tank for storing the liquid;
   (b) a gas pervious material positioned on the inner tank; and
   (c) a jacket made of fibrous reinforced resinous material which covers the gas pervious material and at least about 40% of the surface area of the storage tank to form a closed space, said jacket being structurally independent from the rigid inner tank because of the gas pervious material, having sufficient structural strength to contain liquid in the rigid inner tank which may leak therefrom, and being capable of withstanding external load forces normally encountered by underground storage tanks without suffering substantial surface deformation.

23. The storage tank of claim 22 wherein the storage tank is a metal tank.

24. The storage tank of claim 22 wherein the storage tank is made of a reinforced resinous material having support ridges circumferentially surrounding the tank and the jacket substantially follows the contour of the storage tank's outer surface.

25. The storage tank of claim 22 wherein the storage tank is a used tank which has been refurbished by repairing weakened areas before the jacket is formed thereon.

26. The storage tank of claim 22 wherein fiberglass is used to reinforce the resinous material.

27. The storage tank of claim 22 wherein surface of the gas pervious material which is exposed to the resinous material is first sealed to prevent substantial penetration of the resinous material.

28. The storage tank of claim 27 wherein the gas pervious material is sealed with a polymeric material.

29. The storage tank system of claim 27 wherein the gas pervious material is heat sealed.

30. The storage tank system of claim 22 wherein the jacket covers at least about 90% of the surface area of the storage tank.

31. The storage tank system of claim 22 wherein the jacket encases the storage tank.

32. The storage tanks system of claim 31 further comprising a leak detection means in communication with the closed space.

33. The storage tank system of claim 32 wherein the leak detection means comprises a vacuum means to withdraw material from the closed space and further wherein means are provided for returning said withdrawn material to the inner tank.

34. The storage tank of claim 31 wherein the gas pervious material is selected from the group consisting of mattings, nets, screens and meshes.

35. The storage tank of claim 34 wherein the gas pervious material is selected from the group consisting of jute, polyurethane foam, polyester foam, fiberglass matting, cotton matting, nylon matting, corrugated cardboard and asbestos.

36. The storage tank of claim 35 wherein the gas pervious material is a polyurethane foam.

37. The storage tank of claim 31 further comprising access lines extending into the storage tank's interior and wherein fittings are secured to the inner tank through which each access line passes and to which the jacket is adhered thereto.

38. The storage tank system of claim 37 wherein each fitting further has attached to it a jacket encasing each access line passing therethrough and further wherein leak detection means monitors the closed space between the jacket and the inner tank and the closed space between the jacket and each access line encased thereby.

* * * * *